March 17, 1936.  C. F. CLIMA ET AL  2,034,086
WINDSHIELD WIPER
Filed Jan. 6, 1933  2 Sheets-Sheet 1
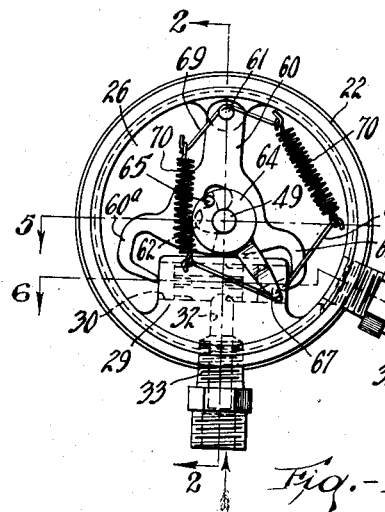
Fig.-1
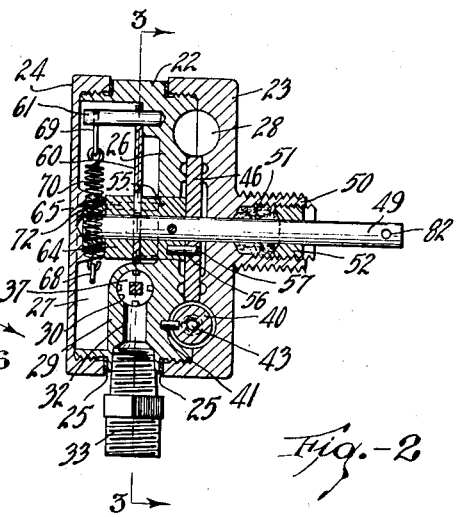
Fig.-2
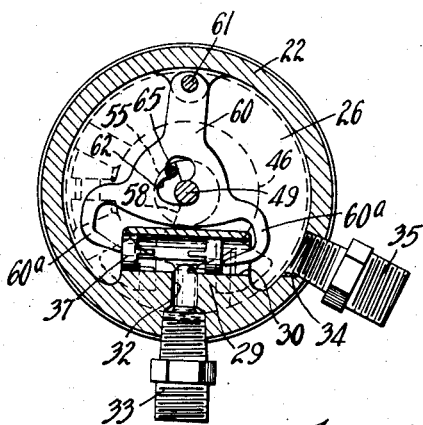
Fig.-3
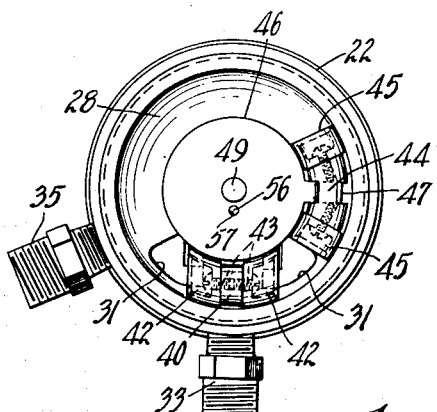
Fig.-4
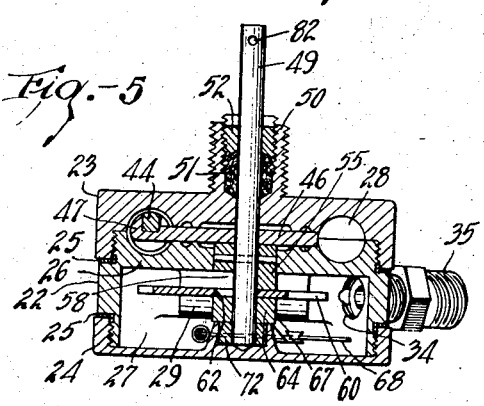
Fig.-5
Fig.-6
INVENTORS
CHARLEY F. CLIMA
RAY H. EVANS.
BY
ATTORNEYS March 17, 1936.    C. F. CLIMA ET AL    2,034,086
WINDSHIELD WIPER
Filed Jan. 6, 1933    2 Sheets-Sheet 2

INVENTORS
CHARLES F. CLIMA
RAY H. EVANS
BY
Ely & Barrow
ATTORNEYS

Patented Mar. 17, 1936

2,034,086

UNITED STATES PATENT OFFICE 2,034,086

WINDSHIELD WIPER

Charley F. Clima, Cleveland, and Ray H. Evans, Akron, Ohio

Application January 6, 1933, Serial No. 650,432

8 Claims. (Cl. 121—97)

This invention relates to windshield wipers, and more especially it relates to windshield wipers operated by fluid under positive pressure set up by the operation of a motor vehicle as distinguished from windshield wipers operated mechanically, electrically, or by suction.

The chief objects of the invention are to provide an improved windshield wiper of superior operation; to provide simplicity of construction; and to effect economy of manufacturing cost. Another object of the invention is to provide a self-lubricated wiper whereby wear is reduced to the minimum. A further and important object of the invention is to provide a pressure-operated wiper that has power and speed in direct proportion to the speed of the vehicle, that is, that operates fastest and with greatest power when the vehicle motor is operating at high speed. Other objects will be manifest as the specification proceeds.

Figure 1 is a rear elevation of the wiper mechanism, the rear cover thereof being removed;

Figure 2 is a vertical section through the wiper mechanism on the line 2—2 of Figure 1;

Figure 3 is a section on the line 3—3 of Figure 2;

Figure 4 is a front elevation of the wiper mechanism, the front cover thereof being removed;

Figure 5 is a section on the line 5—5 of Figure 1;

Figure 6 is a section on the line 6—6 of Figure 1.

Figure 7:
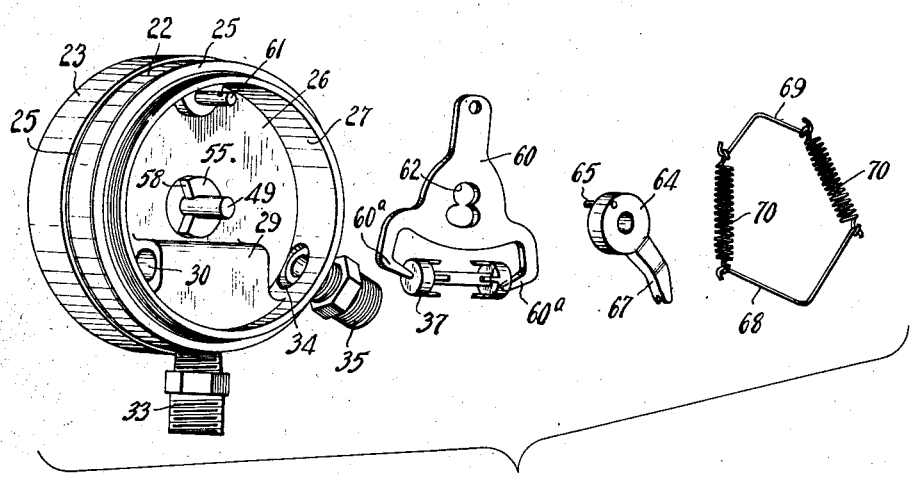
Figure 7 is a disassembled perspective view of the rear end of the wiper mechanism with cover removed, showing the respective parts of the valve-operating mechanism demounted in order.

This invention resides in an improved motor or operating mechanism for windshield wipers, said motor being designed especially for operation by liquid under pressure, preferably oil from the lubricating system of an automobile engine. The motor is of the oscillating type adapted to sweep a suitable wiper blade in a wide arc over the windshield of a motor vehicle, the motor being mounted upon the upper or lower windshield frame as desired.

Referring now to the drawings, the improved windshield wiper comprises a power member or fluid motor comprising a short, cylindrical housing 22, a front cover 23, and a rear cover 24, said covers 23, 24 being threaded onto the housing and gaskets 25, 25 being provided to prevent leakage of oil past the threads. The housing 22 is formed interiorly, at its front end, with a wall or partition 26, the arrangement being such as to define a chamber 27 in the rear of the housing, which chamber is closed by rear cover 24. The front face of the wall 26 is formed with a concentric, annular groove, and the rear face of the front cover 23 is similarly grooved so that together said grooves define a torus shaped annular recess or pressure cylinder 28 that is circular in cross-section, in front of the wall 26. A projection or thickened portion 29 of the wall 26 extends into the chamber 27, at one side thereof, and said projection is formed with an open-end bore 30 that is disposed transversely of the axis of the housing. Diverging passages 31, 31 extend from each end of the bore 30, through the wall 26 into the annular recess 28. A radial bore 32 extends through the wall of the housing 22 and projection 29 into the bore 30, and a nipple 33 is threaded into the outer end of bore 32 for connection with a fluid inlet pipe (not shown). Another bore, 34, extends through the housing wall opposite one end of the bore 30, and a nipple 35 is threaded into the outer end of bore 34 for connection with a fluid-return pipe (not shown).

Figure 8:
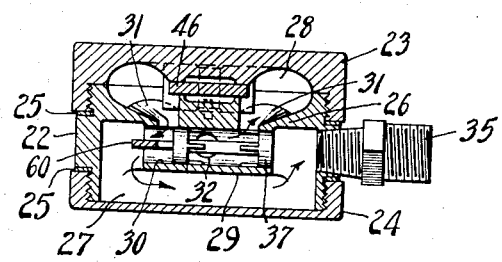
Figure 8 is a section similar to Figure 6, showing the valve in its alternative position.

Slidably mounted in the bore 30 is a valve 37 consisting of a pair of imperforate, spaced-apart heads connected by a stem of reduced size, the overall length of the valve being substantially less than the length of said bore. The valve 37 is adapted to reciprocate longitudinally of the bore 30 so as to put the respective passages 31, in alternation, in communication with the inlet bore 32. The arrangement is such that when one passage 31 is in communication with the inlet 32, the other passage 31 is in communication with the outlet bore 34 through the chamber 27 and that portion of the bore 30 not occupied by the valve 37, as is most clearly shown in Figures 6 and 8.

Positioned in the annular cylinder 28, between the two passages 31, is a partition comprising a short, cylindrical, metal disc 40 (see Figures 2 and 4) that is fixed in place by means of a dowel 41 extending into the wall 26. The lateral faces of the disc 40 are provided with respective cup-gaskets 42 suitably secured to the disc by set screws 43—43, said gaskets sealing against the wall of the cylinder 28 so as to prevent the flow of fluid from one passage 31 to the other.

Also mounted in the annular cylinder 28 is a waisted, metal piston 44 that has its respective ends provided with cup-gaskets 45, 45 engaging the wall of the said chamber as is most clearly shown in Figure 4. Positioned between the wall 26 and front cover 23 is a circular metal disc 46, the lateral faces of which closely fit against said wall and cover, and the peripheral face of which is at the inner periphery of the cylinder 28. The disc 46 is formed with a hook-like radial projection 47, (see Figures 4 and 5) that interfits the waisted portion of the piston 45 so that said disc constitutes, in effect, a piston rod that is moved angularly by movement of the piston under the impetus of fluid flowing into the cylinder 28.

The disc 46 is axially apertured to accommodate a shaft 49 that extends freely therethrough. The shaft 49 also passes through the front cover 23 which is formed with an externally threaded, axial projection 50 in which is mounted a stuffing box for the shaft 49, said stuffing box comprising packing 51 and gland 52. A nut 53 threaded onto the projection 50 is provided for mounting the wiper structure on a vehicle. The shaft 49 is oscillated by mechanism presently to be described, and it carries, on its outer end, the wiper blade (not shown).

Fixedly mounted upon the shaft 49 is a generally cylindrical bushing 55 that is journaled in a suitable aperture in the wall 26, behind the disc 46, and said bushing is provided with a forwardly projecting stud or dowel 56 that fits into a complemental aperture 57 in the disc 46, whereby angular movement of said disc causes similar movement of the shaft 49. At its rear end the bushing 55 is formed with a sector-shaped cut away portion 58 of substantially 140 degrees.

The valve 37 is reciprocated by a pivoted, oscillatable lever 60. The said lever is a metal plate that is pivotally mounted upon a pin or post 61, the latter being mounted in the wall 26, near the peripheral wall of the housing 22, diametrically opposite the projection 29. One lateral face of the lever 60 abuts the rear end of the bushing 55, and the said lever is centrally formed with an aperture 62 that is somewhat similar to a trefoil in contour. The shaft 49 extends through the aperture 62, the shape of the latter being such as to permit oscillating or pendulous movement of the lever. The free end of the lever is formed with a pair of arcuate arms 60ª, 60ª that engage the respective ends of the valve 37 in the bore 30, as is most clearly shown in Figures 1 and 3.

Journaled upon the shaft 49, in abutting relation to the rear face of the pivoted lever 60 is a cylindrical member 64 that is provided with a laterally projecting stud 65 that extends through the aperture 62 and into the sector-shaped cut away portion 58 of the bushing 55. The arrangement is such that oscillating movement of the shaft 49 and the bushing 55 thereon causes the radial end-walls of the cut away portion 58 alternately to engage the stud 65, and thus to oscillate the member 64, said stud engaging the lever-edge about the aperture 62 and moving said lever to one of its alternative positions, whereby the valve 37 is operated. The cut away portion 58 provides lost motion such that the lever 60 operates the valve 37 after the shaft 49 has turned angularly about 180 degrees.

The member 64 is formed with a radially extending arm 67 disposed diametrically opposite the stud 65, and the free end of said arm is slotted to receive an angular wire yoke 68. A somewhat similar yoke 69 is engaged about the post 61 which may be slotted to retain said yoke, and the respective ends of said yokes are connected by tension springs 70, 70. The arrangement is such that as soon as the arm 67 moves over center during an operative movement of the member 64 the springs 70 quickly snap said member to its extreme position, thereby quickly operating the lever 60 and valve 37. This is especially advantageous when the pressure of the operating fluid is low, and slow movement of the valve 37 might result in a balanced condition of the fluid on opposite sides of the piston 44 due to both passages 31 being in communication with the inlet port 32 at the same time.

The rear end of the shaft 49 is journaled in a bearing bushing 72 that is mounted in an axial boss formed on the inner face of the rear cover 24. When the covers are in place on the housing the several operative elements in the latter are held in their proper relative positions notwithstanding they are not permanently secured to each other or to the housing. The construction facilitates assembly, and repair, if necessary, and reduces cost of manufacture.

In the operation of the mechanism described, fluid enters the valve-bore 30, thence passing to the arcuate pressure cylinder 28 through one of the passages 31 depending upon the position of valve 37. Fluid entering cylinder 28 moves the piston 44 thereof and thus causes angular movement of the disc 46. Angular movement of disc 46 similarly moves the bushing 55 connected thereto and shaft 49 mounted in the bushing. After the bushing 55 has turned angularly a determinate distance, it engages the stud 65 in its cut away portion 58 and moves said stud sufficiently to cause it to engage the lever 60 and thereby to move the said lever and the valve 37 to their alternative positions. The over-center springs 70 supplement the fluid pressure in quickly reversing the position of the said valve. In the alternative position of the valve 37, fluid flows into the cylinder 28 through the other passage 31, and moves the piston 44 in the direction opposite to that of its previous movement, the fluid on the opposite side of the piston being forced out of the cylinder by way of the opposite passage 31 into that portion of bore 30 not occupied by valve 37, thence into chamber 27 and into the return pipe.

This completes one cycle of operation which effects an angular movement or oscillation of the shaft 49 through 180 degrees. The operation is repeated as long as adequate fluid pressure is delivered to the device. It will operate satisfactorily on any pressure above 10 pounds, and its speed of operation is in direct proportion to the fluid pressure. Thus the device operates faster on a vehicle moving at high speed than it does on one that is stationary with motor idling. The oil that operates the device penetrates between the relatively moving parts thereof, so that the device is self-lubricating.

The wiper is practically noiseless in operation, and it provides an excellent means for checking the functioning of the lubricating system since failure of the wiper to operate would indicate something wrong with the lubricating system.

Modification may be resorted to without departing from the spirit of the invention or the scope of the appended claims, which are not limited wholly to the specific construction shown and described.

What is claimed is:

1. In a device of the character described, the combination of a hollow cylindrical housing formed with a wall across one end thereof, covers on the respective ends of said housing, annular cavities in one face of the wall and the adjacent cover defining an annular pressure, a transverse partition in said cylinder, a valve on the opposite side of the wall, there being passages from said valve to the cylinder on opposite sides of the partition, said cylinder thus constituting a double acting fluid pressure cylinder, a piston in said cylinder, a shaft disposed axially of the housing, means connecting the piston and shaft, and means for conducting fluid pressure to and from the valve.

2. A combination as defined in claim 1 in which the valve is a sliding valve, including a pivoted lever for operating said valve, and a lost-motion connection between the shaft and pivoted lever for operating the latter.

3. In a device of the character described, the combination of a double-acting fluid pressure device, a shaft adapted to be oscillated by said device, a valve controlling the operation of said device, a pivoted lever for operating said valve, said lever being formed with a central aperture through which the shaft extends, a bushing fixed to the shaft on one side of said lever and formed with a recess, a member journaled on the shaft on the opposite side of the lever and formed with a stud that extends through the aperture in the lever and into the recess in the bushing, said stud being adapted to engage and oscillate the lever when the shaft is oscillated, said member also being formed with a radial arm, and resilient means connected to said arm for carrying the valve across dead center.

4. The combination as defined in claim 3 in which the resilient means comprises tensioned over-center mechanism engaging said radial arm for quickly moving the pivoted lever to its respective positions notwithstanding the speed of oscillation of the shaft.

5. In a device of the character described, the combination of an arcuate pressure cylinder, a piston adapted to oscillate therein, an axial shaft to which said piston is connected, a valve structure comprising an open-end bore, there being passages from said bore into said cylinder on opposite sides of the piston thereof and a fluid inlet disposed centrally of the bore, a slide valve of less length than the bore mounted therein, and a two-arm lever concurrently engaging the opposite ends of the valve through the open ends of the valve bore for moving said valve from one end of said bore to the other whereby fluid from the inlet passes through one passage into the pressure cylinder, and fluid from the latter passes through the other passage into that portion of the valve bore not occupied by the valve and escapes through the open end of said bore.

6. In a windshield wiper, the combination of a shaft adapted to support a wiper blade, an annular pressure cylinder concentric with said shaft, a piston in said cylinder connected to said shaft whereby oscillation of said piston will oscillate said shaft on its axis, a transverse partition in said cylinder, a valve structure disposed outside the plane of said cylinder and comprising a bore that is open at both ends and has passages extending from adjacent its respective ends into said cylinder, on opposite sides of the partition therein, there being a fluid inlet into the central part of said bore, a valve of less length than the bore slidably mounted therein, said valve having a recessed medial portion connecting a pair of spaced-apart, imperforate heads and being adapted to place said inlet alternately in communication with either of said passages and to uncover the other passage so that fluid may exhaust therethrough into the valve-bore and out through the adjacent open end thereof, and means for reciprocating said valve in timed relation to the oscillation of said piston, said means comprising a pivoted lever formed with a pair of arms that concurrently engage the respective heads of the valve through the open ends of the valve-bore.

7. In a fluid motor, the combination of a housing an arcuate pressure cylinder therein, a piston adapted to oscillate in said cylinder, an axial shaft to which said piston is connected, a valve structure comprising a bore that is open at both ends, there being passages from said bore into said cylinder on opposite sides of the piston thereof and a fluid inlet disposed centrally of said bore, a slide valve in said bore adapted to move from one end of the latter to the other whereby fluid from the inlet passes, in alternation, through one passage into the pressure chamber, and fluid from the latter passes through the other passage into that portion of the valve bore not occupied by the valve and passes out of the adjacent open end of said bore, a chamber in the housing about the valve structure formed with an outlet port, said chamber constituting a passage through which exhaust fluid from the valve reaches said outlet port, and a mechanical interconnection between said shaft and valve disposed wholly within said chamber and valve bore for reciprocating said valve in timed relation to the oscillation of said piston.

8. In a fluid motor, the combination of a housing, an arcuate pressure cylinder therein, a piston adapted to oscillate in said cylinder, an axial shaft to which said piston is connected, a valve structure comprising a bore that is open at both ends, there being passages from said bore into said cylinder on opposite sides of the piston thereof and a fluid inlet disposed centrally of said bore, a slide valve in said bore adapted to move from one end of the latter to the other whereby fluid from the inlet passes, in alternation, through one passage into the pressure chamber, and fluid from the latter passes through the other passage into that portion of the valve bore not occupied by the valve and passes out of the adjacent open end of the bore, a chamber in the housing about the valve structure formed with an outlet port, said chamber constituting a passage through which exhaust fluid from the valve reaches said outlet port, and means wholly within said chamber and valve bore for reciprocating said valve in timed relation to the oscillation of said piston, said means including a lever pivotally mounted within the chamber and in contact with opposite ends of the valve.

CHARLEY F. CLIMA.
RAY H. EVANS.

CERTIFICATE OF CORRECTION.

Patent No. 2,034,086. March 17, 1936.

CHARLEY F. CLIMA, ET AL.

It is hereby certified that error appears in the printed specification of the above numbered patent requiring correction as follows: Page 3, first column, line 3, claim 1, after "pressure" and before the comma insert cylinder; and that the said Letters Patent should be read with this correction therein that the same may conform to the record of the case in the Patent Office.

Signed and sealed this 14th day of April, A. D. 1936.

Leslie Frazer (Seal)  Acting Commissioner of Patents.